(12) United States Patent
Yang et al.

(10) Patent No.: US 8,161,465 B2
(45) Date of Patent: Apr. 17, 2012

(54) METHOD AND APPARATUS FOR PERFORMING CONDITIONAL COMPILATION

(75) Inventors: Minghui Yang, Fremont, CA (US); Chandrasekharan Iyer, Foster City, CA (US); Charles Wetherell, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1217 days.

(21) Appl. No.: 11/495,850

(22) Filed: Jul. 27, 2006

(65) Prior Publication Data
US 2008/0028373 A1 Jan. 31, 2008

(51) Int. Cl.
*G06F 9/45* (2006.01)
(52) U.S. Cl. .......................... 717/140; 717/148; 717/153
(58) Field of Classification Search .................. None
See application file for complete search history.

(56) References Cited

U.S. PATENT DOCUMENTS

| | | | |
|---|---|---|---|
| 6,065,035 A * | 5/2000 | Shulman et al. | 718/100 |
| 6,427,234 B1 * | 7/2002 | Chambers et al. | 717/140 |
| 7,305,666 B2 * | 12/2007 | Burger et al. | 717/140 |
| 7,322,023 B2 * | 1/2008 | Shulman et al. | 717/112 |
| 7,543,281 B2 * | 6/2009 | King et al. | 717/140 |
| 7,840,950 B2 * | 11/2010 | Stoodley et al. | 717/151 |
| 2005/0010897 A1 * | 1/2005 | Ogawa et al. | 717/106 |
| 2006/0225052 A1 * | 10/2006 | Waddington et al. | 717/136 |
| 2006/0259503 A1 * | 11/2006 | Bradateanu et al. | 707/102 |
| 2007/0006142 A1 * | 1/2007 | Shulman et al. | 717/111 |
| 2007/0055963 A1 * | 3/2007 | Waddington et al. | 717/140 |

OTHER PUBLICATIONS

Bryn Llewellyn, PL/SQL Conditional Compilation, Oct. 10, 2005, Oracle Corporation, pp. 1-91.*
Oracle, "Oracle Database PL/SQL User's Guide and Reference 10g Release 2 (10.2)", Jun. 2005, pp. 1-496 <http://www.google.com/#sclient=psyab&hl=en&source=hp& q=conditional+compilation>.*
Kästner et al., "Variability-Aware Parsing in the Presence of Lexical Macros and Conditional Compilation", 2011 ACM, pp. 805-823 < http://dl.acm.org/results.cfm?h=1&cfid=73059734&cftoken=36055686>.*
Couto et al., "Extracting Software Product Lines: A Case Study Using Conditional Compilation", 2011 EEE, pp. 191-200 <http://ieeexplore.ieee.org/search/searchresult.jsp?newsearch=true&queryText=conditional+compilation>.*
Oracle, "PL/SQL conditional compilation: An Oracle White Paper", Oct. 2005, pp. 1-96, www.oracle.com/technology/tech/pl_sql/pdf/plsql_conditional_compilation.pdf.

* cited by examiner

*Primary Examiner* — Thuy Dao
*Assistant Examiner* — Ben Wang
(74) *Attorney, Agent, or Firm* — Shun Yao; Park, Vaughan, Fleming & Dowler LLP

(57) ABSTRACT

One embodiment of the present invention provides a system that facilitates performing conditional compilation. The system operates by analyzing programming language source code prior to compilation to locate a preprocessing directive that specifies a condition to be evaluated, and also identifies source code to be conditionally included during compilation of the source code. Next, the system generates evaluation source code that evaluates the condition. The system then evaluates the condition by evaluating ordinary programming language and environmental variables within the evaluation source code. Note that the run-time variables are also available at run-time during execution of a compiled version of the original source code. Next, the system conditionally includes source code associated with a result of the evaluation and compiles the revised source code. Finally, the system records the use of any variables during condition evaluation in a persistent manner and automatically restarts the entire processing if any of the recorded variables may have been changed subsequent to the original compilation.

16 Claims, 3 Drawing Sheets

```
PROCEDURE IEEE754_DEMO IS
    $IF dbms_dv_version.version >= 10 $THEN
        f binary_float := 1.0f;
        d binary_double := 1.0d;
    $ELSE
        $ERROR 'unsupported database version ' ||
            dbms_db_version.version
        $END
    $END
BEGIN
    . . .
```

```
PACKAGE p AS
     SUBTYPE my_number IS $IF
     dbms_db_version.ver_le_9
     $THEN NUMBER $ELSE BINARY FLOAT $END;
END;
```

FIG. 3A

```
PACKAGE p AS
     SUBTYPE my_number IS

BINARY FLOAT      ;
END;
```

FIG. 3B

METHOD AND APPARATUS FOR PERFORMING CONDITIONAL COMPILATION

BACKGROUND

1. Field of the Invention

The present invention relates to compilers for programming languages. More specifically, the present invention relates to a method and an apparatus for performing conditional compilation.

2. Related Art

Programs often include sections of source code which, in some situations, may not be desirable to compile or to execute. For example, a program might include sections of source code which make use of language or system features only available on some releases of a product. Additionally, a program might include source code that implements capabilities which should only be available to some users. Or, a program might implement debugging, tracing, or testing components which should not appear in the delivered executable code.

During the code development process, programmers often manually build and keep track of multiple source code versions, with each version containing (or not containing) the code fragments chosen for a particular version of the application. This can be problematic because the number of versions, and subsequent choices for each version, can quickly grow out of hand.

An alternative technique called "conditional compilation" is commonly used to selectively compile sections of source code. During conditional compilation, the source code to be compiled is selected from the source code file by evaluation conditions based on values supplied by the programmer or obtained from the environment. Typically, in conditional compilation systems, the programmer embeds preprocessor directives in the source code, which direct the preprocessor to select the appropriate sections of source code to compile. The modified source code from the preprocessor is then compiled by a standard compiler. (The C preprocessor cpp is an example of a preprocessor used in conditional compilation.)

However, conditional compilation is not without problems. The preprocessor may not interact properly with the language, the compiler, and other language tools (notably, debuggers). In addition, the programmer does not actually control the source code seen by the compiler; and often the programmer never even sees that final source code.

Due to the difficulties of maintaining separate code bases, and the problems with existing conditional compilation systems, many organizations write applications that avoid newer language features to ensure compatibility with older systems. The problems caused by changes in language features are so severe at some organizations that application developers at these organizations commonly refuse to consider the use of a new language feature until all fielded releases of the language support the feature. In some cases, this has caused a delay of up to five years from the time a feature is added to the language until the time it begins to be incorporated into applications written in the language.

Hence, what is needed is a method for performing conditional compilation without the problems listed above.

SUMMARY

One embodiment of the present invention provides a system that facilitates performing conditional compilation. The system operates by analyzing programming language source code early in compilation to locate a preprocessing directive that specifies a condition to be evaluated, and also identifies source code to be conditionally included during compilation of the source code. Next, the system generates evaluation source code to evaluate the condition. The system then evaluates the condition by compiling and executing the generated ordinary programming language which may reference environmental variables during that execution. Note that the environmental variables may be ordinary variables of the programming language and are also available at run-time during execution of a compiled version of the original source code. Finally, the system conditionally includes source code associated with a result of the evaluation and compiles the revised source code.

In a variation of this embodiment, the system stores a record of the environmental variables and the ordinary programming language variables which were used during the conditional compilation step to persistent storage.

In a further variation, if any of the source programs which house the ordinary programming language variables which were recorded as being using in the compilation of a particular unit changes, then the system automatically recompiles the unit which recorded the variables. Note that this recompilation includes a complete reanalysis of any conditional compilation constructs in the source program and therefore reevaluation of any environmental variables which may control particular selections during conditional compilation.

In a further variation, the persistent storage is a database.

In a variation of this embodiment, the programming language is PL/SQL®.

In a variation of this embodiment, the preprocessing directive is written in the same programming language as the source code.

In a variation of this embodiment, a line of code in the programming language file has the same line number as an identical line of code in the modified programming language file.

In a variation of this embodiment, evaluating the condition further involves compiling the evaluation source code, and executing the compiled evaluation source code.

BRIEF DESCRIPTION OF THE FIGURES

FIG. 3A illustrates source code prior to conditional compilation in accordance with an embodiment of the present invention.

FIG. 3B illustrates source code after conditional compilation preprocessing in accordance with an embodiment of the present invention.

DETAILED DESCRIPTION

Figures 1, 2:
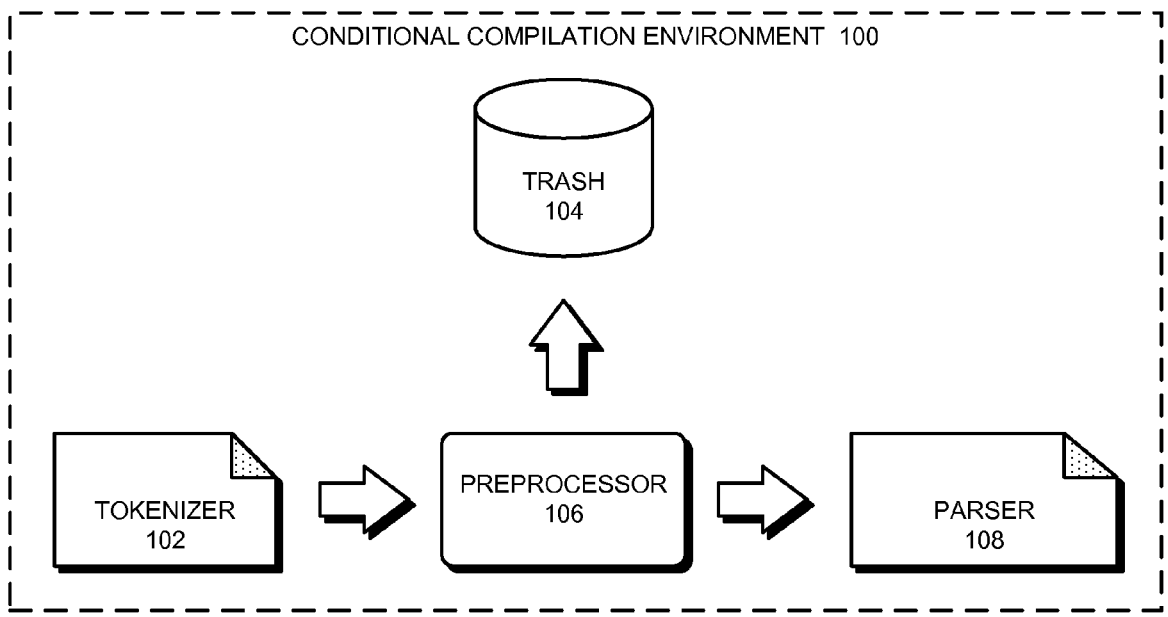
FIG. 1 illustrates a conditional compilation environment in accordance with an embodiment of the present invention.
FIG. 2 illustrates source code with a preprocessing directive in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs).

Overview

One embodiment of the present invention provides a system that facilitates conditional compilation for PL/SQL®, wherein the conditional compilation directives are integrated with the PL/SQL® source code. In addition, this embodiment makes use of the persistent storage available for PL/SQL® program units. Note that although the following detailed description discusses an embodiment of the present invention that uses PL/SQL®, the present invention is not meant to be limited to systems that use pL/SQL®.

One embodiment of the present invention uses variables in conditional compilation, wherein the variables are ordinary variables from the source code programming language that have a static value. In a variation on this embodiment, if any of these static variables are changed or "touched" by a programmer, then all code modules that depend on the changed static variables are automatically recompiled.

One embodiment of the present invention that is described herein includes the following features:

- A language directive $if ... $then ... $end for choosing source code fragments;
- Additional directives and variations to expand the usefulness of the solution;
- The designation of a subset of existing values (static values) which can be evaluated during compilation, and which control conditional directives;
- The ability to specify static values with the existing PL/SQL®, language;
- The ability to reference variable values in units other than the one being compiled (this is normal during execution but not usually during compilation);
- The persistent storage of the references to the other unit variables referenced during conditional compilation using the normal language features of PL/SQL®;
- The evaluation of controlling values and expressions using the normal PL/SQL® language rules;
- The presence of environmental parameters which may be used to control conditional compilation; and
- The automatic recompilation of units when the variables which participate in conditional compilation change.

One embodiment of the present invention facilitates complete integration of all of the above-listed features into the existing programming language. In particular, although the conditional compilation operatives are called "directives", they are syntactically and semantically no different from other programming language constructs. The term "directive" is used only for ease of explication. Furthermore, in this embodiment, all computations follow the normal rules of PL/SQL® evaluation.

Some programming languages designate variables, values, and expressions as "static," that is, capable of being evaluated without execution of the entire program. One embodiment of the present invention extends the notion to some declarations so that names (which would otherwise designate "variables" that require execution to evaluate) can be considered to be static as well. Such names designate static variables which are otherwise indistinguishable from ordinary variables and can be used just as other variables are throughout programs except that their values may not be changed during the execution of the program. This idea facilitates the automatic recompilation of units when variables participating in conditions change.

The PL/SQL® programming language already embodies a notion of "dependency" so that changes in the "environment" which might affect a unit's correctness automatically cause the unit to be recompiled. This notion is extended in a natural way to the conditional-compilation mechanism. A program unit which uses conditional compilation will be automatically recompiled if the variables which participate in the conditional compilation fragments in the unit change or might have changed. It is also important to note that one embodiment of the present invention is not combined with a macro processor and does not suffer from the feature creep which such a combination entails.

Conditional Compilation Environment

FIG. 1 illustrates a conditional compilation environment 100 in accordance with an embodiment of the present invention. Conditional compilation environment 100 includes tokenizer 102, trash 104, preprocessor 106, and parser 108.

During conditional compilation, tokenizer 102 receives the source code. Note that the source code is comprised of both ordinary source code as well as preprocessing directives. Also note that the preprocessing directives are written in the same language as the rest of the source code. In one embodiment of the present invention, preprocessing directives are denoted with the "$" character. Note that any character can be used if the character is not a reserved character for the programming language in question, and if the character is not typically used by the programming language in question. A preprocessing directive can be a conditional, such as $IF (condition) $THEN (code to compile if the condition is true) $ELSE (code to compile if the condition is false) $ENDIF, or an error directive $ERROR which can be used to insert user-defined compile time error messages. In addition, the system may also use predefined inquiry directives, such as $$plsql_unit, $$plsql_line, and $$plsql_code_type.

Tokenizer 102 breaks down the source code into individual tokens of source code. A programming language token is a single meaningful element in the language much as words and punctuation are the meaningful elements in human languages. These tokens are then sent to preprocessor 106 for preprocessing.

Preprocessor 106 processes all of the preprocessing directives and throws any of the unselected tokens into trash 104. Preprocessor 106 accomplishes this by evaluating static expressions associated with the preprocessing directives, and then choosing the appropriate tokens of code as determined by the preprocessing directives. Note that these static expressions can include static variables that are also available at run-time to an application that comprises a compiled version of the source code.

In addition to the static variables and constants, special preprocessing inquiry directives may also be used. For example, $$plsql_debug (which indicates system debug state) or $$my_debug (whose meaning is defined by the user and presumably indicates a user's debug state) may be evaluated to determine if debug code should be compiled.

Once preprocessor 106 finishes preprocessing the source code, preprocessor 106 outputs the selected tokens (the preprocessed source code) to parser 108. Note that in one embodiment of the present invention, preprocessor 106 and parser 108 are part of a compiler. Also note that in one embodiment of the present invention, the code that is not conditionally compiled (as well as the preprocessing directives) is replaced by space in the preprocessed source code. This results in specific sections of code in the original source code having the exact same line number and location in preprocessed source code, which can be very important in some situations.

Source Code that Includes a Preprocessing Directive

FIG. 2 illustrates source code with a preprocessing directive in accordance with an embodiment of the present invention. In the example illustrated in FIG. 2, if the installed version of the database (dbms_dv_version.version) is at least "10", then "f" is declared as a binary float and "d" is declared as a binary double. On the other hand, if the installed version of the database is less than "10", then the user is presented with an error message at compile time that states, "unsupported database version," as well as displaying the currently installed database version. Note that the variable dbms_dv_version.version is available to a program at run-time, and is not available to conditional compilation preprocessors in existing systems. Also note that the present invention allows programmers to store all of their code in one set of source files for different versions of an application that require different installed components. Typically, the source code for these different versions are stored and managed separately by the programmer. Hence, the present invention allows for tighter integration of source code with less management overhead for the programmer.

Source Code—Before and After Conditional Compilation Preprocessing

FIG. 3A illustrates source code prior to conditional compilation in accordance with an embodiment of the present invention. In this example, the conditional of the preprocessing directive is based on the installed database version. If the condition is true, then the subtype of my_number is NUMBER. However, if the condition is false, then the subtype of my_number is BINARY FLOAT.

FIG. 3B illustrates source code after conditional compilation preprocessing in accordance with an embodiment of the present invention. In this example, the conditional of the preprocessing directive was evaluated to be false, so the subtype of my_number is declared to be BINARY FLOAT.

By comparing the example illustrated in FIG. 3B to the example illustrated in FIG. 3A, it is easy to see that the existing code in FIG. 3B has the exact same spatial location in the resulting preprocessed source code as the corresponding code in the original source code. This can be important for a number of reasons. Some languages use line numbers and character numbers for various reasons. In addition, preprocessor 106 may use inquiry directives that are dependent on line numbers, such as $$plsql_line.

Performing Conditional Compilation

Figure 4:
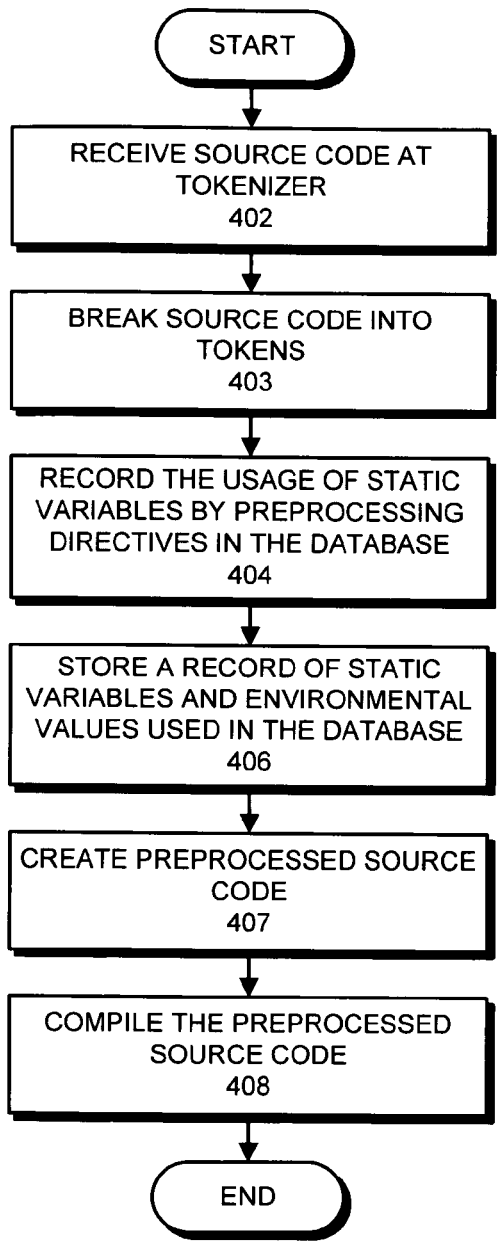
FIG. 4 presents a flowchart illustrating the process of performing conditional compilation in accordance with an embodiment of the present invention.

FIG. 4 presents a flowchart illustrating the process of performing conditional compilation in accordance with an embodiment of the present invention. The system starts by receiving the original source code at tokenizer 102 (step 402). Next, the system breaks the source code into tokens (step 403). Then, the system evaluates static expressions in the source code to determine which tokens to keep for compiling, and which tokens to discard (step 404). Next, the system stores a record of the static variables and the environmental values used in the evaluation into the database (step 406), and creates the preprocessed source code, which includes only the selected tokens (step 407). Finally, the system compiles the preprocessed source code (step 408).

Performing Automatic Re-Compilation

Figure 5:
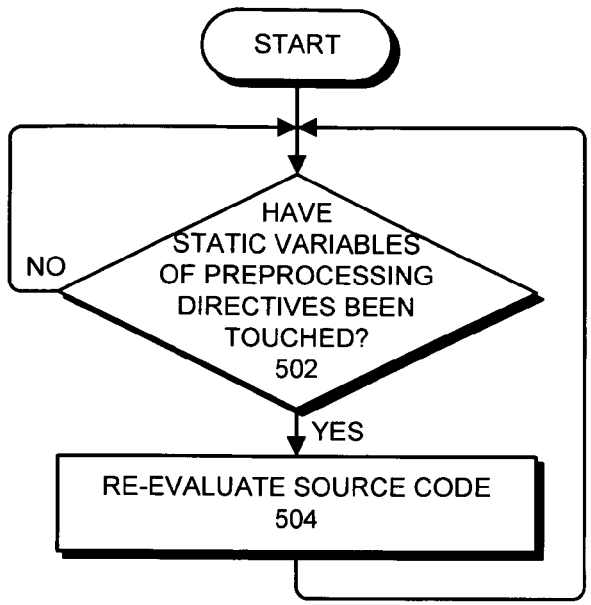
FIG. 5 presents a flowchart illustrating the process of performing automatic re-compilation in accordance with an embodiment of the present invention.

FIG. 5 presents a flowchart illustrating the process of performing automatic re-compilation in accordance with an embodiment of the present invention. The system starts by determining if any of the static variables of the preprocessing directives have been touched (step 502). If so, the system re-compiles the source code in preprocessor 106; the result of the compilation may change depending on changes in the referenced static variables and in other aspects of the compilation environment (step 504). The system then returns to step 502 to monitor changes in the status of static variables. If not, the system similarly returns to step 502 to monitor changes in the status of static variables. In this manner, as soon as a static variable that was the basis for a conditional compilation preprocessing directive has a possible change, the source code is automatically re-compiled to account for the (possibly) changed static variable. In this embodiment, the check may be deferred until the compiled source code is about to be executed or until the compiled source code is referenced during the compilation of some other source code.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for performing conditional compilation, the method comprising:
　analyzing, by a preprocessor, a programming language file prior to compilation to locate a preprocessing directive that specifies a condition to be evaluated and source code to be conditionally included during subsequent compilation;
　generating, by the preprocessor, evaluation code in the same programming language as the source code which evaluates a variable within the condition, wherein the variable is available without execution of the programming language file;
　evaluating the condition by evaluating the variable; and
　creating, a preprocessed programming language file by conditionally including source code associated with the evaluation of the condition.

2. The method of claim 1, further comprising recording the variable used during evaluation to a persistent storage.

3. The method of claim 2, wherein if the variable used during a conditional compilation has a changed value, the method further comprises:
　re-evaluating the condition based on the programming language file;
　creating a new preprocessed programming language file by conditionally including source code associated with the re-evaluation of the condition; and
　compiling the new preprocessed programming language file.

4. The method of claim 2, wherein the persistent storage is a database.

5. The method of claim 1, wherein a line of code in the programming language file has the same line number as an identical line of code in the preprocessed programming language file.

6. The method of claim 1, wherein evaluating the condition further involves:
    compiling the evaluation code; and
    executing the compiled evaluation code.

7. The method of claim 1, wherein evaluating the condition involves evaluating conditional-compilation variables.

8. A non-transitory computer-readable storage medium storing instructions that when executed by a computer cause the computer to perform a method for performing conditional compilation, the method comprising:
    analyzing, by a preprocessor, a programming language file prior to compilation to locate a preprocessing directive that specifies a condition to be evaluated and source code to be conditionally included during subsequent compilation;
    generating, by the preprocessor, evaluation code in the same programming language as the source code and which evaluates a variable within the condition, wherein the variable is available without execution of the programming language file;
    evaluating the condition by evaluating the variable; and
    creating a preprocessed programming language file by conditionally including source code associated with the evaluation of the condition.

9. The non-transitory computer-readable storage medium of claim 8, wherein the method further comprises storing the variable used during the evaluation of the condition to a persistent storage.

10. The non-transitory computer-readable storage medium of claim 9, wherein if the variable used during a conditional compilation has a changed value, the method further comprises:
    re-evaluating the condition based on the programming language file;
    creating a new preprocessed programming language file by conditionally including source code associated with the preprocessing directive based upon the re-evaluation of the condition; and
    compiling the new preprocessed programming language file.

11. The non-transitory computer-readable storage medium of claim 9, wherein the persistent storage is a database.

12. The non-transitory computer-readable storage medium of claim 8, wherein a line of code in the programming language file has the same line number as an identical line of code in the preprocessed programming language file.

13. The non-transitory computer-readable storage medium of claim 8, wherein evaluating the condition further involves:
    compiling the evaluation code; and
    executing the compiled evaluation code.

14. The non-transitory computer-readable storage medium of claim 8, wherein evaluating the condition involves evaluating conditional-compilation variables.

15. A computer system for performing conditional compilation, comprising:
    a processor; and
    a memory;
    an analysis mechanism that analyzes a programming language file prior to compilation to locate a preprocessing directive that specifies a condition to be evaluated and source code to be conditionally included during a subsequent compilation;
    a code-generation mechanism that generates evaluation code in the same programming language as the source code which evaluates a variable within the condition, wherein the variable is available without execution of the programming language file;
    an evaluation mechanism that evaluates the condition by evaluating the variable; and
    a code-creation mechanism that creates a preprocessed programming language file by conditionally including source code associated with the evaluation of the condition.

16. The computer system of claim 15,
    wherein the evaluation mechanism re-evaluates the condition based on the programming language file;
    wherein the code-creation mechanism further creates a new preprocessed programming language file by conditionally including source code associated with the re-evaluation of the condition; and
    wherein the code-compilation mechanism compiles the new preprocessed programming language file.

* * * * *

UNITED STATES PATENT AND TRADEMARK OFFICE
CERTIFICATE OF CORRECTION

| | | |
|---|---|---|
| PATENT NO. | : 8,161,465 B2 | Page 1 of 1 |
| APPLICATION NO. | : 11/495850 | |
| DATED | : April 17, 2012 | |
| INVENTOR(S) | : Yang et al. | |

It is certified that error appears in the above-identified patent and that said Letters Patent is hereby corrected as shown below:

In column 3, line 25, delete "pL/SQL®." and insert -- PL/SQL®. --, therefor.

In column 3, line 43, delete "PL/SQL®," and insert -- PL/SQL® --, therefor.

In column 6, line 47, in Claim 1, delete "creating," and insert -- creating --, therefor.

Signed and Sealed this
Seventeenth Day of July, 2012

David J. Kappos
*Director of the United States Patent and Trademark Office*